US011897265B2

(12) United States Patent
Nagano et al.

(10) Patent No.: US 11,897,265 B2
(45) Date of Patent: Feb. 13, 2024

(54) CLEANING LIQUID, SET, INK-JET RECORDING APPARATUS AND CLEANING METHOD

(71) Applicant: Brother Kogyo Kabushiki Kaisha, Nagoya (JP)

(72) Inventors: Taro Nagano, Nagoya (JP); Hirofumi Kuriki, Nagoya (JP); Shunichi Higashiyama, Yokkaichi (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 242 days.

(21) Appl. No.: 17/538,243

(22) Filed: Nov. 30, 2021

(65) Prior Publication Data

US 2022/0111653 A1 Apr. 14, 2022

Related U.S. Application Data

(63) Continuation of application No. PCT/JP2020/013082, filed on Mar. 24, 2020.

(30) Foreign Application Priority Data

May 31, 2019 (JP) ................................ 2019-102154

(51) Int. Cl.
*B41J 2/165* (2006.01)
*C11D 1/72* (2006.01)
(Continued)

(52) U.S. Cl.
CPC ........... *B41J 2/16552* (2013.01); *C11D 1/721* (2013.01); *C11D 3/2044* (2013.01);
(Continued)

(58) Field of Classification Search
CPC ......... B41J 2/16552; B41J 2002/16558; C11D 1/721; C11D 3/2044; C11D 3/2068; C11D 3/43; C11D 11/0041
See application file for complete search history.

(56) References Cited

U.S. PATENT DOCUMENTS 5,609,671 A 3/1997 Nagasawa
8,435,339 B2 5/2013 Koyano et al.
(Continued)

FOREIGN PATENT DOCUMENTS

CA 2848034 A1 10/2015
CN 101784621 A 7/2010
(Continued)

OTHER PUBLICATIONS

Nov. 22, 2022—(JP) Notice of Reasons for Refusal—App 2019-102154.
(Continued)

*Primary Examiner* — Bradley W Thies
(74) *Attorney, Agent, or Firm* — Banner & Witcoff, Ltd.

(57) ABSTRACT

There is provided a cleaning liquid usable for cleaning of an ink-jet recording apparatus, the cleaning liquid including: a first water-soluble organic solvent, a vapor pressure at 20° C. of the first water-soluble organic solvent being not less than 7 Pa; a second water-soluble organic solvent, a vapor pressure at 20° C. of the second water-soluble organic solvent being not more than 1 Pa; a nonionic surfactant; and water. The cleaning liquid satisfies the following conditions (1) to (3):

Condition (1): $10 \leq A+B \leq 60$; Condition (2): $A/B \geq 1$; Condition (3): $(A+B)/C \geq 10$.

In the conditions (1) to (3), A: a content amount (% by mass) of the first water-soluble organic solvent, B: a content
(Continued)

amount (% by mass) of the second water-soluble organic solvent, and C: a content amount (% by mass) of the nonionic surfactant.

12 Claims, 1 Drawing Sheet

(51) Int. Cl.
*C11D 3/20* (2006.01)
*C11D 3/43* (2006.01)
*C11D 11/00* (2006.01)

(52) U.S. Cl.
CPC .............. *C11D 3/2068* (2013.01); *C11D 3/43* (2013.01); *C11D 11/0041* (2013.01); *B41J 2002/16558* (2013.01)

(56) References Cited

U.S. PATENT DOCUMENTS

| | | | |
|---|---|---|---|
| 8,474,966 | B2 | 7/2013 | Aoki et al. |
| 9,878,541 | B2 | 1/2018 | Maeda et al. |
| 10,053,592 | B2 | 8/2018 | Ozawa et al. |
| 10,293,600 | B2 | 5/2019 | Kanke |
| 2005/0018023 | A1* | 1/2005 | Momose ................ B41J 2/1707 347/95 |
| 2007/0100024 | A1 | 5/2007 | Gu et al. |
| 2009/0229489 | A1 | 9/2009 | Gu |
| 2010/0196602 | A1 | 8/2010 | Koyano et al. |
| 2011/0234727 | A1 | 9/2011 | Aoki et al. |
| 2013/0194345 | A1 | 8/2013 | Tamai et al. |
| 2015/0258796 | A1 | 9/2015 | Tamai et al. |
| 2015/0344713 | A1 | 12/2015 | Mizushima et al. |
| 2016/0250857 | A1 | 9/2016 | Imai et al. |
| 2017/0008312 | A1 | 1/2017 | Kanke |
| 2017/0182779 | A1 | 6/2017 | Maeda et al. |
| 2017/0267879 | A1 | 9/2017 | Kohzuki et al. |
| 2017/0267885 | A1 | 9/2017 | Wakabayashi et al. |
| 2018/0148591 | A1 | 5/2018 | Ozawa et al. |
| 2018/0371273 | A1 | 12/2018 | Nishiura |
| 2019/0092954 | A1 | 3/2019 | Nishiura et al. |
| 2019/0329553 | A1 | 10/2019 | Suzuki et al. |

FOREIGN PATENT DOCUMENTS

| | | | |
|---|---|---|---|
| CN | 102233720 | A | 11/2011 |
| CN | 104870577 | A | 8/2015 |
| CN | 106573485 | A | 4/2017 |
| CN | 106947317 | A | 7/2017 |
| CN | 108102462 | A | 6/2018 |
| JP | H08-3498 | A | 1/1996 |
| JP | 2000-513396 | A | 10/2000 |
| JP | 2002-514258 | A | 5/2002 |
| JP | 2004-115553 | A | 4/2004 |
| JP | 2008-524400 | A | 7/2008 |
| JP | 2009-515007 | A | 4/2009 |
| JP | 2010-052418 | A | 3/2010 |
| JP | 2011-515535 | A | 5/2011 |
| JP | 2011-255566 | A | 12/2011 |
| JP | 2013-058918 | A | 3/2013 |
| JP | 2013-241552 | A | 12/2013 |
| JP | 2015-186906 | A | 10/2015 |
| JP | 2018-021122 | A | 2/2018 |
| JP | 2018-127580 | A | 8/2018 |
| WO | 97/48769 | A1 | 12/1997 |
| WO | 98/54277 | A1 | 12/1998 |
| WO | 2006/066132 | A2 | 6/2006 |
| WO | 2007/053564 | A2 | 5/2007 |
| WO | 2009/117071 | A1 | 9/2009 |
| WO | 2018124124 | A1 | 7/2018 |

OTHER PUBLICATIONS

Feb. 7, 2023—(JP) Decision of Refusal—App 2019-102154.
Jul. 21, 2020—(WO) International Search Report—App PCT/JP2020/013082.
Jul. 21, 2020—(WO) Written Opinion of the ISA—App PCT/JP2020/013082.
Jun. 14, 2022—(CN) The First Office Action—App 202080039691.X.
Sep. 2, 20236—(EP) Office Action—App 20719765.8.

* cited by examiner

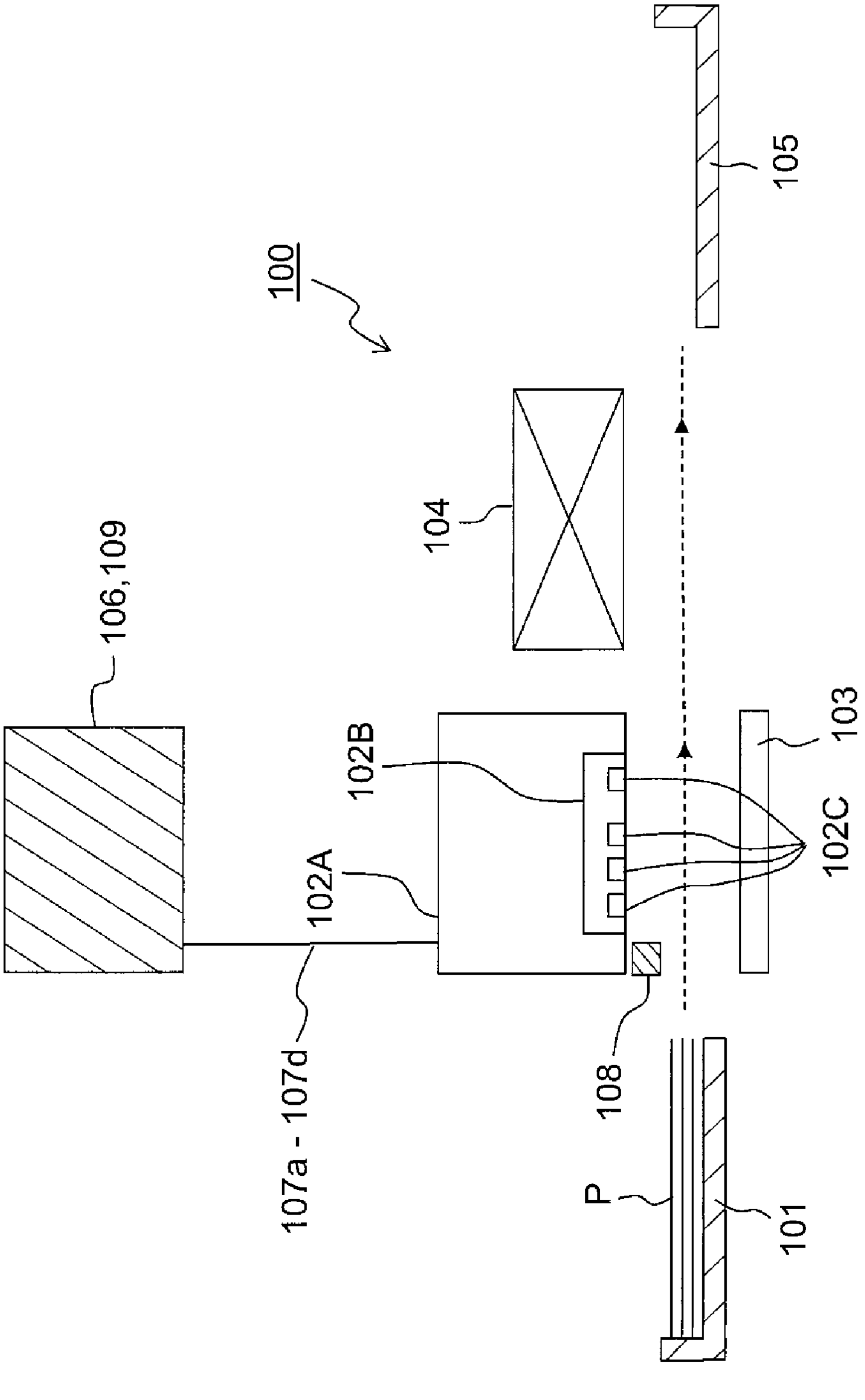
100
105
104
106,109
102B
103
102C
102A
107a - 107d
108
P
101

CLEANING LIQUID, SET, INK-JET RECORDING APPARATUS AND CLEANING METHOD

CROSS REFERENCE TO RELATED APPLICATIONS

This application is a Continuation Application of International Application No. PCT/JP2020/013082 which was filed on Mar. 24, 2020 claiming the conventional priority of Japanese patent Application No. 2019-102154 filed on May 31, 2019. The disclosures of Japanese patent Application No. 2019-102154 and International Application No. PCT/JP2020/013082 are incorporated herein by reference in their entirety.

BACKGROUND

The present disclosure relates to a cleaning liquid (cleaning fluid, cleaning solution), a set, an ink-jet recording apparatus and a cleaning method.

A variety of kinds of cleaning liquid are proposed as a cleaning liquid for a discharge nozzle (jetting nozzle) and an ink channel of an ink-jet recording apparatus. For example, as a cleaning liquid having an excellent wetting property and an excellent cleaning property, and even in a case that a pigment ink is used for printing, having an excellent mutual solubility with respect to the pigment ink, it is proposed that a cleaning liquid containing a fluorine-based surfactant, and an acetylene glycol-based surfactant in which an average molar number of addition of ethylene oxide is in a range of 0 to 30.

SUMMARY

On the other hand, there is a demand for a water-based ink for ink-jet recording which has a satisfactory wetting property with respect to a recording medium having a low water-absorbing property or having a non-water absorbing property (hereinafter referred to as "hydrophobic" recording medium, in some cases), such as coated paper, film, etc. In order to provide such a water-based ink, it is conceivable to add a wetting agent in the water-based ink. However, in a case that maintenance (cleaning of a discharge nozzle, a wiper wiping the discharge nozzle, an ink channel, etc.) is performed in an ink-jet recording apparatus using the water-based ink (added with the wetting agent), the wetting agent in the water-based ink undergoes a phase separation, which in turn causes any blocking (stoppage, closing) and/or clogging of the channel, in some cases.

In view of the above situation, an object of the present disclosure is to provide a cleaning liquid capable of suppressing any closing of channel and clogging of nozzle(s) during the maintenance of an ink-jet recording apparatus using a water-based ink having a satisfactory wetting property to a hydrophobic recording medium.

According to a first aspect of the present disclosure, there is provided a cleaning liquid usable for cleaning of an ink-jet recording apparatus, the cleaning liquid including:

- a first water-soluble organic solvent, a vapor pressure at 20° C. of the first water-soluble organic solvent being not less than 7 Pa;
- a second water-soluble organic solvent, a vapor pressure at 20° C. of the second water-soluble organic solvent being not more than 1 Pa:
- a nonionic surfactant; and
- water.

The cleaning liquid satisfies the following conditions (1) to (3):

$$10 \leq A+B \leq 60 \quad \text{Condition (1):}$$

$$A/B \geq 1 \quad \text{Condition (2):}$$

$$(A+B)/C \geq 10, \quad \text{Condition (3):}$$

in the conditions (1) to (3),

- A: a content amount (% by mass) of the first water-soluble organic solvent in an entire amount of the cleaning liquid,
- B: a content amount (% by mass) of the second water-soluble organic solvent in the entire amount of the cleaning liquid, and
- C: a content amount (% by mass) of the nonionic surfactant in the entire amount of the cleaning liquid.

According to a second aspect of the present disclosure, there is provided a set including:

- the cleaning liquid of the first aspect; and
- a water-based ink for ink-jet recording including water-insoluble particles and water.

According to a third aspect of the present disclosure, there is provided an ink-jet recording apparatus including:

- an ink storage configured to store an ink therein:
- an ink-jet head configured to discharge the ink stored in the ink storage;
- an ink channel provided between the ink storage and the ink-jet head; and
- a cleaning liquid-supplying mechanism configured to supply, to the ink-jet head and the ink channel, the cleaning liquid of the first aspect.

According to a fourth aspect of the present disclosure, there is provided a cleaning method of cleaning an ink-jet recording apparatus including: an ink storage, an ink-jet head, an ink channel provided between the ink storage and the ink-jet head, and a cleaning liquid-supplying mechanism,

- the cleaning method including supplying the cleaning liquid of the first aspect to the ink-jet head and the ink channel, by using the cleaning liquid-supplying mechanism.

BRIEF DESCRIPTION OF THE DRAWINGS

FIG. 1 is a schematic view depicting the configuration of an example of an ink-jet recording apparatus in which a cleaning liquid related to the present disclosure is usable.

DETAILED DESCRIPTION

A cleaning liquid related to the present disclosure is suitably usable to perform maintenance of an ink-jet recording apparatus using a water-based ink for ink-jet recording (hereinafter also referred to as a "water-based ink" or an "ink", in some cases) having a satisfactory wetting property with respect to a recording medium having hydrophobicity such as, for example, coated paper, plastic, film, an OHP sheet, etc., but is not limited to or restricted by this usage.

The cleaning liquid related to the present disclosure is usable to perform maintenance also, for example, of an ink-jet recording apparatus using a water-based ink for ink-jet recording suitable for a recoding medium which is different from the hydrophobic recording medium and which includes, for example, regular paper (plain paper), glossy paper, mat paper, etc. In the present disclosure, the term "coated paper" means, for example, paper obtained by coating, with a coating agent, regular paper made mainly from pulp, such as high-grade print paper and middle-grade print paper. The coating agent is applied to the regular paper to improve its smoothness, whiteness, brightness, etc. The coated paper is specifically exemplified by high-grade coated paper, middle-grade coated paper, etc.

The cleaning liquid related to the present disclosure will be explained. The cleaning liquid related to the present disclosure is a cleaning liquid usable for cleaning of an ink-jet recording apparatus and contains a first water-soluble organic solvent, a second water-soluble organic solvent, a nonionic surfactant, and water.

A vapor pressure at 20° C. of the first water-soluble organic solvent is not less than 7 Pa. The first water-soluble organic solvent is exemplified, for example, by: propylene glycol (hereinafter referred to as "PG", in some cases; vapor pressure at 20° C.: 10.6 Pa), 1,3-butanediol (vapor pressure at 20° C.: 8 Pa), ethylene glycol (hereinafter referred to as "EG", in some cases; vapor pressure at 20° C.: 7 Pa), etc.

Only one kind of the first water-soluble organic solvent as described above may be used singly, or two or more kinds of the first water-soluble organic solvent as described above may be used in combination. A content amount (A) of the first water-soluble organic solvent in the entire amount of the cleaning liquid will be described later on.

A vapor pressure at 20° C. of the second water-soluble organic solvent is not more than 1 Pa. The second water-soluble organic solvent is exemplified, for example, by tripropylene glycol (hereinafter referred to as "TPG", in some cases; vapor pressure at 20° C.: 0.67 Pa), diethylene glycol (hereinafter referred to as "DEG", in some cases; vapor pressure at 25° C.: 0.76 Pa), glycerol (hereinafter referred to as "GLY", in some cases; vapor pressure at 25° C.: 0.01 Pa), 1,5-pentanediol (vapor pressure at 25° C.: 0.52 Pa), triethylene glycol-n-butyl ether (hereinafter referred to as "BTG" in some cases; vapor pressure at 25° C.: 0.33 Pa), tripropylene glycol n-butyl ether (hereinafter referred to as "TPnB" in some cases; vapor pressure at 25° C.: 0.02 Pa), etc. The vapor pressures of DEG, GLY, 1,5-pentanediol, BTG listed above indicate the vapor pressures thereof, respectively, at 25° C. However, since the vapor pressures of these second water-soluble organic solvents at 20° C. are smaller than those at 25° C., the vapor pressure of these second water-soluble organic solvents are not more than 1 Pa at 20° C.

Only one kind of the second water-soluble organic solvent as described above may be used singly, or two or more kinds of the second water-soluble organic solvent as described above may be used in combination. A content amount (B) of the second water-soluble organic solvent in the entire amount of the cleaning liquid will be described later on.

The water-soluble organic solvent contained in the cleaning liquid may be only the first water-soluble organic solvent and the second water-soluble organic solvent as described above. Alternatively, the cleaning liquid may further contain another water-soluble organic solvent, in addition to the first and second water-soluble organic solvents, which is different from the first and second water-soluble organic solvents. The mass ratio of the first water-soluble organic solvent and the second water-soluble organic solvent relative to the entire amount of the water-soluble organic solvent in the cleaning liquid is, for example, not less than 50% by mass or 100°/o by mass.

For example, a commercial available product may be used as the nonionic surfactant. The commercially available product is exemplified, for example, by: "OLFINE (trade name) E1004", "OLFINE (trade name) E1008". "OLFINE (trade name) E1010", which are produced by NISSHIN CHEMICAL CO., LTD.; "SURFYNOL (trade name) 440", "SURFYNOL (trade name) 465" and "SURFYNOL (trade name) 485" which are produced by AIR PRODUCTS AND CHEMICALS. INC.; "ACETYLENOL (trade name) E40" and "ACETYLENOL (trade name) E100" produced by KAWAKEN FINE CHEMICALS CO., LTD.; "EMULGEN (trade name) MS100", "EMULGEN (trade name) 123P", "EMULGEN (trade name) 102KG", "EMULGEN (trade name) 103", "EMULGEN (trade name) 104P", "EMULGEN (trade name) 105", "EMULGEN (trade name) 106", "EMULGEN (trade name) 108", "EMULGEN (trade name) 109P", "EMULGEN (trade name) 120", "EMULGEN (trade name) 130K", "EMULGEN (trade name) 147", "EMULGEN (trade name) 150", "EMULGEN (trade name) 210P", "EMULGEN (trade name) 220", "EMULGEN (trade name) 306P", "EMULGEN (trade name) 320P". "EMULGEN (trade name) 350", "EMULGEN (trade name) 404", "EMULGEN (trade name) 408", "EMULGEN (trade name) 409PV", "EMULGEN (trade name) 420", "EMULGEN (trade name) 430", "EMULGEN (trade name) 705", "EMULGEN (trade name) 707", "EMULGEN (trade name) 709", "EMULGEN (trade name) MS1108", "EMULGEN (trade name) 1118S-70", "EMULGEN (trade name) 1135S-70", "EMULGEN (trade name) 1150S-60". "EMULGEN (trade name) 4085", "EMULGEN (trade name) 2020G-HA". "EMULGEN (trade name) 2025G", "EMULGEN (trade name) LS-106", "EMULGEN (trade name) LS-110", "EMULGEN (trade name) LS-114", "EMULGEN (trade name) MS-110", "EMULGEN (trade name) A-60", "EMULGEN (trade name) A-90", "EMULGEN (trade name) A-500", "EMULGEN (trade name) B-66", "EMULGEN (trade name) PP-290", "RHEODOL (trade name) TW-P120", "RHEODOL (trade name) 460V, and "RHEODOL (trade name) TW-IS399C" produced by KAO CORPORATION: "NYMEEN (trade name) S-210" produced by NOF CORPORATION; "NOIGEN (trade name) XL" series, "NOIGEN (trade name) TDS" series, "NOIGEN (trade name) LF-80X), "NOIGEN (trade name) LF-100X", "NOIGEN (trade name) TDX" series, "NOIGEN (trade name) SD" series, "NOIGEN (trade name) LP" series, "DKS NL-Dash" series, "NOIGEN (trade name) CL-230", "ANTI-FROTH (trade name" M-7", "ANTI-FROTH (trade name) M-9, "NOIGEN (trade name) EA" series, "NOIGEN (trade name) EN" series, "PHE-1", "EPAN (trade name)" series, "DKS NL" series, "NOIGEN (trade name) ET" series, "NOIGEN (trade name) ES" series, "NOIGEN (trade name) DS-601" series, "NOIGEN (trade name) GIS" series. "NOIGEN (trade name) HC" series, "Amilazine (trade name) D", "SORGEN (trade name) TW-10", "SORGEN (trade name) TW-60", "SORGEN (trade name) TW-80V" and "SORGEN (trade name) TW-80" produced by DKS CO. LTD. (DAI-ICHI KOGYO SEIYAKU CO., LTD.); etc.

The nonionic surfactant may contain an acetylene glycol-based surfactant having an ethylene oxide skeleton (ethylene oxide chain). Among the above-described commercially available products of the nonionic surfactant, "OLFINE (trade name) E1004". "OLFINE (trade name) E1008", "OLFINE (trade name) E1010", which are produced by NISSHIN CHEMICAL CO., LTD.; "SURFYNOL (trade name) 440", "SURFYNOL (trade name) 465" and "SURFYNOL (trade name) 485" which are produced by AIR PRODUCTS AND CHEMICALS. INC.; "ACETYLENOL (trade name) E40" and "ACETYLENOL (trade name) E100" produced by KAWAKEN FINE CHEMICALS CO., LTD., correspond to the acetylene glycol-based surfactant having the ethylene oxide skeleton.

Only one kind of the nonionic surfactant as described above may be used singly, or two or more kinds of the nonionic surfactant as described above may be used in combination. A content amount (C) of the nonionic surfactant in the entire amount of the cleaning liquid will be described later on.

The surfactant contained in the cleaning liquid may be only the nonionic surfactant, or may be only the acetylene glycol-based surfactant having the ethylene oxide skeleton. Alternatively, the cleaning liquid may further contain, in addition to the nonionic surfactant, another surfactant which is different from the nonionic surfactant.

The water is preferably ion-exchanged water or pure water (purified water). The content amount of the water in the entire amount of the cleaning liquid is, for example, in a range of 10% by mass to 90% by mass, or in a range of 20% by mass to 80% by mass. The content amount of the water may be, for example, a balance of the other components.

Although it is preferred that the cleaning liquid does not contain any colorant, the cleaning liquid may contain a colorant. In a case that the cleaning liquid contains a colorant, it is preferred that a content amount of the colorant in the cleaning liquid is an amount to such an extent which does not affect a recorded image. The content amount of the colorant in the entire amount of the cleaning liquid is, for example, not more than 0.1% by mass, or 0% by mass.

The cleaning liquid ink may further include a conventionally known additive, as necessary. The additive is exemplified, for example, by pH-adjusting agents, viscosity-adjusting agents, surface tension-adjusting agents, fungicides, etc. The viscosity-adjusting agents are exemplified, for example, by polyvinyl alcohol, cellulose, water-soluble resin, etc. In view of further suppressing any closing of channel and clogging of nozzle(s), the cleaning liquid ink may not include water-insoluble particles which are similar to those included in a water-based ink described later. The water-insoluble particles may be exemplified, for example, by a pigment, a resin for dispersing pigment (resin dispersant), resin minutes particles (resin fine particles), etc.

The cleaning liquid can be prepared, for example, by uniformly mixing the first water-soluble organic solvent, the second water-soluble organic solvent, the nonionic surfactant and the water by a conventionally known method.

The cleaning liquid satisfies the following conditions (1) to (3). The cleaning liquid contains the first water-soluble organic solvent, the second water-soluble organic solvent and the nonionic surfactant such that the above-described conditions (1) to (3) are satisfied, thereby making it possible to suppress any closing of channel and/or clogging of nozzle during the maintenance of an ink-jet recording apparatus using a water-based ink having a satisfactory wetting property to a hydrophobic recording medium.

$$10 \leq A+B \leq 60 \qquad \text{Condition (1):}$$

$$A/B \geq 1 \qquad \text{Condition (2):}$$

$$(A+B)/C \geq 10, \qquad \text{Condition (3):}$$

in the conditions (1) to (3),

A: a content amount (% by mass) of the first water-soluble organic solvent in an entire amount of the cleaning liquid, B: a content amount (% by mass) of the second water-soluble organic solvent in the entire amount of the cleaning liquid, C: a content amount (% by mass) of the nonionic surfactant in the entire amount of the cleaning liquid.

The cleaning liquid may further satisfy the following condition (4) and/or condition (5).

$$A/B \leq 15 \qquad \text{Condition (4):}$$

$$(A+B)/C \leq 60 \qquad \text{Condition (5):}$$

wherein in the conditions (4) and (5).

A: a content amount (% by mass) of the first water-soluble organic solvent in the entire amount of the cleaning liquid, B: a content amount (% by mass) of the second water-soluble organic solvent in the entire amount of the cleaning liquid, C: a content amount (% by mass) of the nonionic surfactant in the entire amount of the cleaning liquid.

It is allowable to appropriately adjust each of the content amount (A) of the first water-soluble organic solvent, the content amount (B) of the second water-soluble organic solvent and the content amount (C) of the nonionic surfactant so as to satisfy the above-described conditions (1) to (3), for example, as follows.

The content amount (A) of the first water-soluble organic solvent is, for example, in a range of 5% by mass to 40% by mass.

The content amount (B) of the second water-soluble organic solvent is, for example, in a range of 2% by mass to 30% by mass, or in a range of 3% by mass to 15% by mass.

The content amount (C) of the nonionic surfactant is, for example, not less than 0.1% by mass., or not less than 0.9% by mass. The upper limit value of the content amount (C) of the nonionic surfactant is not particularly limited, and is, for example, not more than 1.5% by mass or not more than 1% by mass.

The cleaning liquid may be usable together with a water-based ink including water-insoluble particles and water.

The water-insoluble particles may be exemplified, for example, by a pigment, a resin for dispersing pigment (resin dispersant), resin minutes particles (resin fine particles), etc.

The pigment is not particularly limited, and may be exemplified, for example, by carbon black, an inorganic pigment, an organic pigment, etc. The carbon black is exemplified, for example, by furnace black, lamp black, acetylene black, channel black, etc. The inorganic pigment is exemplified, for example, by titanium oxide, iron oxide-based inorganic pigments, carbon black-based inorganic pigments, etc. The organic pigment is exemplified, for example, by azo-pigments such as azo lake, insoluble azo-pigment, condensed azo-pigment, chelate azo-pigment, etc.; polycyclic pigments such as phthalocyanine pigment, perylene and perynon pigments, anthraquinone pigment, quinacridone pigment, dioxadine pigment, thioindigo pigment, isoindolinone pigment, quinophthalone pigment, etc.: dye lake pigments such as basic dye type lake pigment, acid dye type lake pigment, etc.; nitro pigments: nitroso pigments; aniline black daylight fluorescent pigment; etc. Further, it is also allowable to use, as the pigment, any pigment different from those listed above and dispersible in water phase. Specific examples of these pigments include, for example, C. I. Pigment Blacks 1, 6, and 7; C. I. Pigment Yellows 1, 2, 3, 12, 13, 14, 15, 16, 17, 55, 74, 78, 150, 151, 154, 180, 185, and 194; C. I. Pigment Oranges 31 and 43; C. I. Pigment Reds 2, 3, 5, 6, 7, 12, 15, 16, 48, 48:1, 53:1, 57, 57:1, 112, 122, 123, 139, 144, 146, 149, 150, 166, 168, 175, 176, 177, 178, 184, 185, 190, 202, 209, 221, 222, 224, and 238; C. I. Pigment Violets 19 and 196; C. I. Pigment Blues 1, 2, 3, 15, 15:1, 15:2, 15:3, 15:4, 16, 22, and 60; C. I. Pigment Greens 7 and 36; solid solutions of the above-listed pigments; etc. The water-based ink may be an ink in which the pigment is dispersed in water with a dispersant. As the dispersant, it is allowable to use, for example, a general polymeric dispersant (resin for dispersing pigment or resin dispersant), etc., and may be prepared in-house. Alternatively, in the water-based ink, the pigment may be subjected to polymer capsulation.

The pigment may be a self-dispersible pigment. The self-dispersible pigment is dispersible in water without using any dispersant, for example, owing to the fact that at least one of a hydrophilic functional group and the salt thereof including, for example, carbonyl group, hydroxyl group, carboxylic acid group, sulfonic acid group (sulfonate group), phosphoric acid group (phosphate group), etc., is introduced into the surfaces of the particles of the pigment by the chemical bond directly or with any group intervening therebetween. It is possible to use self-dispersible pigments wherein the pigment is subjected to the surface treatment by any one of methods described, for example, in Japanese Patent Application Laid-open No. HEI8-3498 (corresponding to U.S. Pat. No. 5,609,671), Published Japanese Translation of PCT International Publication for Patent Application No. 2000-513396 (corresponding to U.S. Pat. No. 5,837,045), Published Japanese Translation of PCT International Publication for Patent Application No. 2008-524400 corresponding to United States Patent Application Publication No. US 2006/0201380 A1, Published Japanese Translation of PCT International Publication for Patent Application No. 2009-515007 corresponding to United States Patent Application Publications No. US 2007/0100023 A1 and No. US 2007/0100024 A1, Published Japanese Translation of PCT International Publication for Patent Application No. 2011-515535 corresponding to United States Patent Application Publications No. US 2009/0229489 A1, etc. It is possible to use, as a material for the self-dispersible pigment, either one of the inorganic pigment and the organic pigment. Further, a pigment which is suitable for the above-described treatment includes, for example, carbon black such as "MA8" and "MA100" produced by MITSUBISHI CHEMICAL CORPORATION, etc. As the self-dispersible pigment, it is possible, for example, to use a commercially available product. The commercially available product includes, for example, "CAB-O-JET (trade name) 200", "CAB-O-JET (trade name) 250C", "CAB-O-JET (trade name) 260M", "CAB-O-JET (trade name) 270Y", "CAB-O-JET (trade name) 300", "CAB-O-JET (trade name) 400", "CAB-O-JET (trade name) 450C", "CAB-O-JET (trade name) 465M" and "CAB-O-JET (trade name) 470Y" produced by CABOT SPECIALTY CHEMICALS: "BONJET (trade name) BLACK CW-2" and "BONJET (trade name) BLACK CW-3" produced by ORIENT CHEMICAL INDUSTRIES, LTD.; "LIOJET (trade name) WD BLACK 002C" produced by TOYO INK MFG. CO., LTD., etc.

The solid content amount of the pigment (pigment solid content amount) in the entire amount of the water-based ink is not particularly limited, and may be appropriately determined based on, for example, a desired optical density, chromaticness, etc. The pigment solid content amount is, for example, in a range of 0.1% by mass to 20% by mass, in a range of 1% by mass to 15% by mass, or in a range of 2% by mass to 10% by mass.

The pigment may function, for example, as a colorant.

The water-base ink may contain, as the colorant, a dye instead of, or in addition to, the pigment.

The dye is not specifically limited, and is exemplified, for example, by a direct dye, an acidic dye, a basic dye, a reactive dye, a food dye, etc. Specific examples of the dye include, for example, C. I. Direct Black, C. I. Direct Blue, C. I. Direct Red, C. I. Direct Yellow, C. I. Direct Orange, C. I. Direct Violet, C. I. Direct Brown, C. I. Direct Green. C. I. Acid Black, C. I. Acid Blue, C. I. Acid Red, C. I. Acid Yellow, C. I. Acid Orange, C. I. Acid Violet. C. I. Basic Black, C. I. Basic Blue, C. I. Basic Red. C. I. Basic Violet; C. I. Reactive Blue, C. I. Reactive Red, C. I. Reactive Yellow: C. I. Food Black, C. I. Food Red, C. I. Food Yellow; etc. C. I. Direct Black described above is exemplified, for example, by C. I. Direct Blacks 17, 19, 22, 31, 32, 51, 62, 71, 74, 108, 112, 113, 146, 154, 168, 195, etc. C. I. Direct Blue described above is exemplified, for example, by C. I. Direct Blues 1, 6, 15, 22, 25, 41, 71, 76, 77, 80, 86, 90, 98, 106, 108, 120, 158, 163, 168, 199, 226, etc. C. I. Direct Red described above is exemplified, for example, by C. I. Direct Reds 1, 2, 4, 9, 11, 17, 20, 23, 24, 28, 31, 39, 46, 62, 75, 79, 80, 83, 89, 95, 197, 201, 218, 220, 224, 225, 226, 227, 228, 229, 230, etc. C. I. Direct Yellow described above is exemplified, for example, by C. I. Direct Yellows 8, 11, 12, 24, 26, 27, 28, 33, 39, 44, 50, 58, 85, 86, 87, 88, 89, 98, 100, 110, 132, 142, 173, etc. C. I. Direct Orange described above is exemplified, for example, by C. I. Direct Oranges 34, 39, 44, 46, 60, etc. C. I. Direct Violet described above is exemplified, for example, by C. I. Direct Violets 47, 48, etc. C. I. Direct Brown described above is exemplified, for example, by C. I. Direct Brown 109, etc. C. I. Direct Green described above is exemplified, for example, by C. I. Direct Green 59, etc. C. I. Acid Black described above is exemplified, for example, by C. I. Acid Blacks 2, 7, 24, 26, 31, 48, 51, 52, 63, 110, 112, 115, 118, 158, etc. C. I. Acid Blue described above is exemplified, for example, by C. I. Acid Blues 1, 7, 9, 15, 22, 23, 25, 29, 40, 43, 59, 62, 74, 78, 80, 90, 93, 100, 102, 104, 117, 120, 127, 138, 158, 161, 167, 220, 234, etc. C. I. Acid Red described above is exemplified, for example, by C. I. Acid Reds 1, 6, 8, 9, 13, 14, 18, 26, 27, 32, 35, 37, 42, 51, 52, 80, 83, 85, 87, 89, 92, 94, 106, 114, 115, 133, 134, 145, 158, 180, 198, 249, 256, 265, 289, 315, 317, etc. C. I. Acid Yellow described above is exemplified, for example, by C. I. Acid Yellows 1, 3, 7, 11, 17, 23, 25, 29, 36, 38, 40, 42, 44, 61, 71, 76, 98, 99, etc. C. I. Acid Orange described above is exemplified, for example, by C. I. Acid Oranges 7, 19, etc. C. I. Acid Violet described above is exemplified, for example, by C. I. Acid Violet 49, etc. The C. I. Basic Black is exemplified, for example, by C. I. Basic Black 2, etc. The C. I. Basic Blue is exemplified, for example, by C. I. Basic Blues 1, 3, 5, 7, 9, 24, 25, 26, 28, 29, etc. The C. I. Basic Red is exemplified, for example, by C. I. Basic Reds 1, 2, 9, 12, 13, 14, 37, etc. The C. I. Basic Violet is exemplified, for example, by C. I. Basic Violets 7, 14, 27, etc. C. I. Reactive Blue described above is exemplified, for example, by C. I. Reactive Blues 4, 5, 7, 13, 14, 15, 18, 19, 21, 26, 27, 29, 32, 38, 40, 44, 100, etc. C. I. Reactive Red described above is exemplified, for example, by C. I. Reactive Reds 7, 12, 13, 15, 17, 20, 23, 24, 31, 42, 45, 46, 59, etc. C. I. Reactive Yellow described above is exemplified, for example, by C. I. Reactive Yellows 2, 3, 17, 25, 37, 42, etc. C. I. Food Black described above is exemplified, for example, by C. I. Food Blacks 1, 2, etc. C. I. Food Red described above is exemplified, for example, by C. I. Food Reds 87, 92, 94, etc. C. I. Food Yellow described above is exemplified, for example, by C. I. Food Yellow 3, etc.

It is allowable that one kind of the dye as described above is used singly, or two or more kinds of the dye are used in combination. The content amount of the dye in the entire amount of the water-based ink is, for example, in a range of 0.1% by mass to 20% by mass, in a range of 1% by mass to 15% by mass, or in a range of 2% by mass to 10% by mass.

The water-based ink may be a color ink (chromatic ink) including the colorant, or may be a colorless or achromatic ink (clear ink) not including any colorant.

The glass-transition temperature (Tg) of the resin minute particles is, for example, in a range of −60° C. to 150° C., in a range of 20° C. to 100° C., or is not more than 55° C. The resin minute particles may be, for example, resin minute particles contained in a resin emulsion. The term "resin emulsion" means a resin emulsion composed of, for example, the resin minute particle and a disperse medium (for example, water, etc.); in the resin emulsion, the resin minute particles are dispersed with a specific particle diameter (particle size) in the disperse medium, rather than in a dissolved state in the disperse medium. In the present specification, the resin particles included in the resin emulsion are defined as "emulsion particles". The resin minute particles may be exemplified, for example, by acrylic acid-based resin, maleate ester-based resin, vinyl acetate-based resin, carbonate-based resin, styrene-based resin, ethylene-based resin, propylene-based resin, urethane-based resin, and copolymer resin thereof. Only one kind of the resin minute particles as described above may be used singly, or two or more kinds of the resin minute particles as described above may be used in combination.

As the resin emulsion, it is allowable to use, for example, a commercially available product. The commercially available product is exemplified, for example, by "MOWINYL (trade name) 6969D" (acrylic resin emulsion) (Tg: 71° C.), "MOWINYL (trade name) 5450" (Tg: 53° C.) and "MOWINYL (trade name) DM772" (Tg: 22° C.) produced by JAPAN COATING RESIN CO., LTD.: "POLYSOL (trade name) AP-3770 (styrene-acrylic resin emulsion) produced by SHOWA DENKO K.K.; "SUPERFLEX (trade name) 150" (urethane resin emulsion) (Tg: 40° C.) produced by DKS CO., LTD. (DAI-ICHI KOGYO SEIYAKU CO., LTD.); etc.

The mean particle diameter of the resin minute particles is, for example, in a range of 5 nm to 500 nm, in a range of 20 nm to 300 nm or in a range of 30 nm to 200 nm. The mean particle diameter can be measured, for example, by using a dynamic light scattering particle diameter distribution measuring apparatus "LB-550" (product name) produced by HORIBA, LTD., as the arithmetic mean diameter. The mean particle diameter may be a mean particle diameter (intensity mean particle diameter) calculated based on an intensity-based particle size distribution (light scattering intensity-based particle size distribution).

The content amount of the resin minute particles in the entire amount of the water-based ink is, for example, in a range of 0.1% by mass to 30% by mass, in a range of 0.5% by mass to 20% by mass, or in a range of 1% by mass to 10% by mass. One kind of the resin minute particles described above may be used singly, or two or more kinds of the resin minute particles as described above may be used in combination.

The water in the above-described water-based ink is preferably ion-exchanged water or pure water (purified water). The content amount of the water in the entire amount of the water-based ink is, for example, in a range of 10% by mass to 90% by mass, or in a range of 20% by mass to 80% by mass. The content amount of the water may be, for example, a balance of the other components.

The water-based ink may further contain a water-soluble organic solvent and a surfactant which are similar to those in the cleaning liquid, as described above.

The water-based ink may further include a conventionally known additive, as necessary. The additive is exemplified, for example, by pH-adjusting agents, viscosity-adjusting agents, surface tension-adjusting agents, fungicides, etc. The viscosity-adjusting agents are exemplified, for example, by polyvinyl alcohol, cellulose, water-soluble resin, etc.

The water-based ink can be prepared, for example, by uniformly mixing the water-insoluble particles, the water and an optionally other additive(s) as necessary, by a conventionally known method, and then removing any non-dissolved matter, with a filter, etc.

According to the present disclosure, a set of the above-described cleaning liquid and the above-described water-based ink can also be provided.

For example, the cleaning liquid is usable for cleaning the ink-jet head, the ink channel, and a wiper which makes contact with the nozzle-formation surface of the ink-jet head having nozzles formed therein so as to wipe the ink off from the nozzle-formation surface, etc., in the ink-jet recording apparatus.

Next, an ink-jet recording apparatus and a cleaning method of the ink-jet recording apparatus related to the present disclosure will be explained.

The ink-jet recording apparatus related to the present disclosure is an ink-jet recording apparatus characterized by including: an ink storing part (ink storage), an ink-jet head, and an ink channel provided between the ink storing part and the ink-jet head, and being configured to discharge an ink stored in the ink storing part by the ink-jet head; the ink-jet recording apparatus further including a cleaning liquid-supplying mechanism, wherein the cleaning liquid-supplying mechanism is capable of supplying, to the ink-jet head and the ink channel, the cleaning liquid related to the present disclosure. The ink-jet recording apparatus related to the present disclosure may further include a wiper configured to make contact with a nozzle-formation surface, of the ink-jet head, and the cleaning liquid-supplying mechanism may be capable of supplying the cleaning liquid to the wiper. Further, as will be described later on, the ink-jet recording apparatus related to the present disclosure may further include a drying mechanism configured to dry a recording part or recording portion recorded with the ink.

The cleaning method of cleaning an ink-jet recording apparatus related to the present disclosure is a cleaning method of cleaning an ink-jet recording apparatus including: an ink storing part (ink storage), an ink-jet head, and an ink channel provided between the ink storing part and the ink-jet head, the method being characterized by supplying the cleaning liquid related to the present disclosure by a cleaning liquid-supplying mechanism to thereby clean the ink-jet head and the ink channel. In the cleaning method related to the present disclosure, the ink-jet recording apparatus further includes a wiper configured to make contact with a nozzle-formation surface, of the ink-jet head: the cleaning method may clean the wiper by supplying the cleaning liquid, to the wiper, by the cleaning liquid-supplying mechanism.

FIG. 1 schematically depicts an exemplary configuration of the ink-jet recording apparatus related to the present disclosure. As depicted in FIG. 1, an ink-jet recording apparatus 100 includes a feed tray 101, a conveyance mechanism (not depicted) such as a roller, recording mechanisms 102A and 102B, a platen 103, a drying mechanism 104, a discharge tray 105, and an ink storing part (ink storage) 106 such as ink cartridges or ink tanks. The feed tray 101 can support a plurality of pieces of a recording medium P (e.g., a plurality of pieces of coated paper sheet) stacked thereon.

The recording mechanism includes a carriage 102A and an ink-jet head (ink discharging mechanism) 102B. The carriage 102A is supported by two guide rails (not depicted) extending orthogonally with respect to a conveyance direction of the recording medium P. The two guide rails are supported by a casing (not depicted) of the ink-jet recording apparatus 100. The carriage 102A is connected to a well-known belt mechanism (not depicted) provided in the two guide rails. The belt mechanism is driven by a carriage motor (not depicted). The carriage motor is driven to thereby cause the carriage 102A connected to the belt mechanism to reciprocate (move reciprocatingly) in an orthogonal direction which is orthogonal with respect to the conveyance direction of the recording medium P.

Further, four ink tubes (ink channels) 107*a* to 107*d* connecting the ink storing part 106 and the ink-jet head 102B, and a flexible flat cable (not depicted) electrically connecting a control board (not depicted) and the ink-jet head 102B extend from the carriage 102A. Water-based inks of four colors (yellow, magenta, cyan, and black) stored in the ink storing part 106 are supplied to the ink-jet head 102B via the four ink tubes 107*a* to 107*d*. For example, at least one of the four color water-based inks is the water-based ink for ink-jet recording which constructs the set related to the present disclosure, together with the cleaning liquid related to the present disclosure. A control signal outputted from the control board is transmitted to the ink-jet head 102B via the flexible flat cable.

As depicted in FIG. 1, the carriage 102A has the ink-jet head 102B mounted or installed therein. Nozzles 102C are formed in a lower surface of the ink-jet head 102B. A front end of each of the nozzles 102C is exposed from the carriage 102A and the lower surface of the ink-jet head 102B. The ink-jet head 102B includes an actuator (not depicted) which applies force for jetting or discharging the water-based ink(s) which is (are) supplied from the ink storing part 106 to the ink-jet head 102B via the ink tube(s) 107*a* to 107*d*. The actuator may be an actuator of any system, such as a piezoelectric element system, a thermal ink-jet system, an electrostatic attraction system, etc. The ink-jet head 102B jets or discharges the water-based ink, as fine or minute ink droplets of the water-based ink, from the nozzles 102C during a process in which the carriage 102A reciprocates in the orthogonal direction with respect to the conveyance direction of the recording medium P. With this, an image is recorded on the recording medium P. The ink-jet recording apparatus 100 may be provided with a wiper 108 configured to perform wiping of a surface, having the plurality of nozzles 102C formed therein, of the ink-jet head 102B which is returned to a reset position in a case that recording is finished. The platen 103 is arranged so as to face the recording mechanism, and supports the recording medium P conveyed from the feed tray 101.

The drying mechanism 104 heats and dries a recording part of the recording medium P. The drying temperature during the drying can be adjusted as appropriate by changing the setting of the drying mechanism 104. Specifically, the drying temperature may be, for example, in a range of 20° C. to 200° C. or in a range of 50° C. to 100° C. The drying time may be also adjusted as appropriate by changing the setting of the drying mechanism 104. For example, the drying time may be in a range of a second(s) exceeding 0 (zero) seconds to not more than 300 seconds, in a range of 0.1 seconds to 60 seconds, or in a range of 30 seconds to 60 seconds. Any drying mechanism which is capable of drying the recording part may be used as the drying mechanism 104. Examples of the drying mechanism 104 include, for example, commercially available dryers. IR heaters, ovens, belt conveyer ovens, irons, hot presses, etc. A non-contact drying mechanism, such as the drier, IR heater, the oven, the belt conveyer oven, etc., which dries the recording part of the recording medium P without contacting with the recording part is preferably used.

The recording medium P after recording and drying is conveyed to the discharge tray 105.

The cleaning liquid-supplying mechanism supplies the cleaning liquid to the ink-jet head 102B, the ink tube(s) 107*a* to 107*d*, the wiper 108, etc., and performs the cleaning of the ink-jet head 102B, the ink tube(s) 107*a* to 107*d*, the wiper 108, etc., with the cleaning liquid. The cleaning liquid-supplying mechanism may be any mechanism provided that the mechanism is capable of supplying the cleaning liquid to the ink-jet head 102B, the ink tube(s) 107*a* to 107*d*, the wiper 108, etc. For example, it is allowable to use, as the cleaning liquid-supplying mechanism, a cleaning liquid-storing part 109 configure to store the cleaning liquid therein. It is allowable that the ink tubes (ink channels) 107*a* to 107*d* are connected to the cleaning liquid-storing part 109, instead of being connected to the ink storing part 106 as depicted in FIG. 1, and to supply the cleaning liquid, rather than the ink, to the ink-jet head 102B, the ink tubes 107*a* to 107*d* and the wiper 108 to thereby clean the ink-jet head 102B, the ink tubes 107*a* to 107*d* and the wiper 108.

EXAMPLES

Next, Examples of the present disclosure are explained together with Comparative Examples. Note that the present disclosure is not limited to and restricted by Examples and Comparative Examples described below.

<Preparation of Resin Dispersant>

135 g of Terathane (trade name) 650 (polyether diol produced by INVISTA (Wichita. KS), 54 g of 2,2'-dimethylolpropionic acid (DMPA), 132 g of sulfolane and 0.06 g of dibutyltin dilaurate (DBTDL) were added to a flask provided with a dropping funnel, a condenser and an agitator (stirring device) under an atmosphere of nitrogen, then were heated up to 60° C. while being mixed, and then were mixed sufficiently; thus, a mixture was obtained. To the obtained mixture, 164 g of m-tetramethylene xylylenediisocyanate (TMXDI) was added with the dropping funnel, and remaining TMXDI in the dropping funnel was rinsed with 15 g of sulfolane into the flask. The temperature was raised up to 100° C., and was maintained at 100° C. until the content rate of isocyanate reached to be not more than 1.3% by mass. Next, the temperature was lowered up to 60° C., then 12.9 g of diethanolamine (DEA) was added to the mixture over 5 (five) minutes with the dropping funnel, and the temperature was maintained at 60° C. until remaining DEA in the dropping funnel was rinsed with 5 g of sulfolane into the flask. Furthermore, the temperature was maintained at 60° C. for one hour, then 376 g of a 3% by mass aqueous solution of potassium hydroxide was added to the mixture over 10 (ten) minutes with the dropping funnel, then 570 g of deionized water was further added to the mixture. Then, the temperature was maintained at 60° C. for one hour, and cooling to the room temperature was performed. Thus, a resin dispersant with 24% by mass of solid content was obtained.

<Preparation of Pigment Dispersion Liquid A>

The resin dispersant was neutralized with either one of potassium hydroxide and amine in order to increase the solubility in water and to make the resin dispersant to easily dissolve to water. Then, a microfluidizer of high-pressure compressed air system (Model name: M-110Y, produced by MICROFLUIDICS (Newton, Massachusetts)) was used so as to produce a mixture in which content amount of carbon black was approximately 27% by mass and the mass ratio (P/D) of the content amount (P) of the carbon black to the content amount (D) of the resin dispersant was P/D=3. Then, deionized water was added to the mixture so that the content amount of the carbon black was made to be approximately 24% by mass for the suitable medium mill grinding condition; and the mixture was milled (pulverized) for 4 (four) hours. After the milling, the deionized water was added, and the mixture was mixed sufficiently. Then, after any impurity was filtered and removed, dilution with deionized water was performed; thus, a pigment dispersion liquid A was obtained.

<Preparation of Pigment Dispersion Liquid B>

A pigment dispersion Liquid B was obtained similarly to the above-described preparation of the pigment dispersion liquid A, except that an Eiger Minimill (Model name: M250, produced by VSE EXP, EIGER MACHINERY INC. (Chicago, Illinois) was used, instead of using the microfluidizer of high-pressure compressed air system, and that a phthalocyanine pigment was used instead of using the carbon black.

<Preparation of Water-Based Inks 1 to 3>

Ingredients or components, except for CAB-O-JET (trade name) 300 and the pigment dispersion liquid A or B, which were included in Water-based ink composition (TABLE 1) were mixed uniformly or homogeneously; and thus an ink solvent was obtained. Subsequently, the ink solvent was added to CAB-O-JET (trade name) 300 and the pigment dispersion liquid A or B, followed by being mixed uniformly, and thus a mixture was obtained. After that, the obtained mixture was filtrated through a cellulose acetate membrane filter (pore size 3.00 μm) produced by TOYO ROSHI KAISHA, LTD., and thus water-based inks 1 to 3 for ink-jet recording as indicated in TABLE 1 was obtained.

<Preparation of Water-Based Ink 4>

Ingredients or components in Water-based ink composition (TABLE 1) were mixed uniformly or homogeneously; and thus a mixture was obtained. After that, the obtained mixture was filtrated through a polytetrafluoroethylene (PTFE) membrane filter (pore size 0.20 μm) produced by TOYO ROSHI KAISHA, LTD., and thus the water-based ink 4 for ink-jet recording as indicated in TABLE 1 was obtained. The water-based ink 4 is a colorless or achromatic ink (clear ink) not including any colorant.

TABLE 1

| | | Water-based ink | | | |
|---|---|---|---|---|---|
| | | 1 | 2 | 3 | 4 |
| Water-based ink composition (% by mass) | CAB-O-JET (trade name) 300 (*1) | 3.75 | — | — | — |
| | Pigment dispersion liquid A (*2) | — | 4.5 | — | — |
| | Pigment dispersion liquid B (*3) | — | — | 3 | — |
| | PG | 25 | 25 | 25 | 25 |
| | TPG | 3 | 3 | 3 | 3 |
| | BTG | 1 | 1 | 1 | 1 |
| | SUPERFLEX (trade name) 150 (*4) | 16.7 | — | — | — |
| | MOWINYL (trade name) 6969D (*5) | — | 12 | 12 | 12 |
| | OLFINE (trade name) E1010 (*6) | 2 | 2 | 2 | 1 |
| | Water | balance | balance | balance | balance |

TABLE 1 (following) - LEGEND (*1): Self-dispersible pigment; produced by CABOT SPECIALTY CHEMICALS, INC.; numerals in TABLE 1 indicate pigment solid content amount.

(*2): Water dispersion of carbon black (containing 1.5% by mass of resin dispersant); numerals in TABLE 1 indicate pigment solid content amount.

(*3): Water dispersion of phthalocyanine pigment (containing 1% by mass of resin dispersant); numerals in TABLE 1 indicate pigment solid content amount.

(*4): Resin emulsion; produced by DAI-ICHI KOGYO SEIYAKU CO., LTD.; the numeral in TABLE 1 indicates the active ingredient amount (solid content amount).

(*5): Resin emulsion; produced JAPAN COATING RESIN CO., LTD.; the numeral in TABLE 1 indicates the active ingredient amount (solid content amount).

(*6): Nonionic surfactant; produced by NISSHIN CHEMICAL CO., LTD.; the numeral in TABLE 1 indicates the active ingredient amount.

Examples 1 to 8 and Comparative Examples 1 to 6

Components which were included in Cleaning Liquid Composition (TABLE 2) as indicated below were mixed uniformly or homogeneously; and thus a cleaning liquid in each of Examples 1 to 8 and Comparative Examples 1 to 6 as indicated in TABLE 2 were obtained.

With respect to the cleaning liquids of Examples 1 to 8 and Comparative examples 1 to 6, evaluation of clogging of nozzle was conducted by the following methods.

<Evaluation Method of Clogging of Nozzle>

The cleaning liquid of each of Examples 1 to 8 and Comparative Examples 1 to 6 and one of the water-based inks 1 to 4 were mixed at a ratio of 1:1 and thus a mixed liquid was obtained. A cartridge filled with the mixed liquid was inserted into a digital multifunctional peripheral DCP-385C equipped with an ink-jet printer produced by BROTHER KOGYO KABUSHIKI KAISHA, and a nozzle discharge pattern was recorded thereby. Afterwards, the digital multifunctional peripheral DCP-385C equipped with the ink-jet printer was left to stand for 24 (twenty four) hours in an environment wherein the temperature was 45° C. and the relative humidity was 30%. After the digital multifunctional peripheral DCP-385C equipped with the ink-jet printer was left to stand for 24 (twenty four) hours as described above, another cartridge filled with the mixed liquid was inserted into the digital multifunctional peripheral DCP-385C equipped with the ink-jet printer in an environment of the room temperature (25° C.), a predetermined maintenance operation for introducing ink was performed, then the nozzle discharge pattern was recorded again. The number of non-discharge nozzle(s) were counted before and after the digital multifunctional peripheral DCP-385C equipped with the ink-jet printer was left to stand as described above, and the clogging of nozzle was evaluated based on the following evaluation criterion. Note that the number of non-discharge nozzle(s) before the digital multifunctional peripheral DCP-385C equipped with the ink-jet printer was left to stand was 0 (zero).

<Evaluation of Clogging of Nozzle: Evaluation Criterion>

AA: The number of non-discharge nozzle(s) after the digital multifunctional peripheral DCP-385C equipped with the ink-jet printer was left to stand was not more than 2.

A: The number of non-discharge nozzle(s) after the digital multifunctional peripheral DCP-385C equipped with the ink-jet printer was left to stand was in a range of 3 to 10.

B: The number of non-discharge nozzle(s) after the digital multifunctional peripheral DCP-385C equipped with the ink-jet printer was left to stand was in a range of 11 to 15.

C: The number of non-discharge nozzle(s) after the digital multifunctional peripheral DCP-385C equipped with the ink-jet printer was left to stand was not less than 16.

The cleaning liquid compositions and the evaluation results of the above-described evaluation in Examples 1 to 8 and Comparative Examples 1 to 6 are indicated in TABLE 2 as follows.

TABLE 2 (following)—LEGEND

6: Nonionic surfactant; produced by NISSIN CHEMICAL INDUSTRY CO., LTD., the numeral in TABLE 2 indicates the active ingredient amount.

7: Nonionic surfactant; produced by KAO CORPORATION: the numeral in TABLE 2 indicates the active ingredient amount.

8: Nonionic surfactant: produced by NISSIN CHEMICAL INDUSTRY CO., LTD.; the numeral in TABLE 2 indicates the active ingredient amount.

TABLE 2

| | | | EXAMPLES | | | | | | | |
|---|---|---|---|---|---|---|---|---|---|---|
| | | | 1 | 2 | 3 | 4 | 5 | 6 | 7 | 8 |
| cleaning liquid composition (% by mass) | First water-soluble organic solvent (A) | PG | 20 | 15 | 5 | — | 30 | — | 40 | 20 |
| | | 1,3-butanediol | — | 5 | — | 15 | — | — | — | — |
| | | EG | — | — | — | — | — | 30 | — | 10 |
| | Second water-soluble organic solvent (B) | TPG | 10 | — | 5 | 5 | 20 | — | 3 | — |
| | | Diethylene glycol | — | 10 | — | — | 10 | — | — | 28 |
| | | 1,5-pentanediol | — | — | — | 10 | — | — | — | — |
| | | BTG | 2 | — | — | — | — | 2 | — | — |
| | | TPnB | — | 0.5 | — | — | — | — | — | 0.5 |
| | Nonionic surfactant (C) | OLFINE (trade name) E1010 (*6) | 1 | — | 0.8 | 1 | — | 1 | 1 | — |
| | | EMULGEN (trade name) 220 (*7) | — | 1 | — | — | — | — | — | 1 |
| | | OLFINE (trade name) E1004 (*8) | — | — | 0.1 | — | 1 | 0.5 | — | — |
| | Water | | balance | balance | balance | balance | balance | balance | balance | balance |
| | A + B | | 32 | 30.5 | 10 | 30 | 60 | 32 | 43 | 58.5 |
| | A/B | | 1.67 | 1.90 | 1 | 1 | 1 | 15 | 13.3 | 1.05 |
| | (A + B)/C | | 32 | 30.5 | 11.1 | 30 | 60 | 21.3 | 43 | 58.5 |
| | | | Clogging of nozzle | | | | | | | |
| | Water-based ink 1 | | AA | A | AA | A | A | A | AA | A |
| | Water-based ink 2 | | AA | AA | AA | A | A | AA | A | A |
| | Water-based ink 3 | | AA | AA | A | AA | A | AA | A | A |
| | Water-based ink 4 | | AA | AA | AA | AA | A | A | A | A |

TABLE 2-continued

| | | COMPARATIVE EXAMPLES | | | | | |
|---|---|---|---|---|---|---|---|
| | | 1 | 2 | 3 | 4 | 5 | 6 |
| First water-soluble organic solvent (A) | PG | 4 | 35 | — | 20 | 40 | 20 |
| | 1,3-butanediol | — | — | — | — | — | — |
| | EG | — | — | 10 | — | — | — |
| Second water-soluble organic solvent (B) | TPG | 4 | 20 | — | 30 | — | — |
| | Diethylene glycol | — | 10 | 20 | — | 30 | — |
| | 1,5-pentanediol | — | — | — | — | — | — |
| | BTG | — | — | — | — | — | — |
| | TPnB | — | — | — | — | — | — |
| Nonionic surfactant (C) | OLFINE (trade name) E1010 (*6) | 1.2 | 2.5 | — | 1 | 3 | — |
| | EMULGEN (trade name) 220 (*7) | — | — | — | — | — | 1 |
| | OLFINE (trade name) E1004 (*8) | — | — | 1.5 | 1 | — | — |
| | Water | balance | balance | balance | balance | balance | balance |
| | A + B | 8 | 65 | 30 | 50 | 70 | 20 |
| | A/B | 1 | 1.67 | 0.5 | 0.667 | 1.33 | — |
| | (A + B)/C | 6.67 | 26 | 20 | 25 | 23.3 | 20 |
| | Clogging of nozzle | | | | | | |
| | Water-based ink 1 | B | B | C | C | B | C |
| | Water-based ink 2 | B | C | A | B | C | B |
| | Water-based ink 3 | A | B | B | A | C | B |
| | Water-based ink 4 | A | A | C | C | B | C |

As indicated in TABLE 2, in Examples 1 to 8, the evaluation result was satisfactory in relation to the clogging of nozzle in all of the water-based inks 1 to 4.

On the other hand, Comparative Example 1 in which $(A+B)/C<10$ and which did not satisfy the above-described condition (3), Comparative Examples 2 and 5 in which $A+B>60$ and which did not satisfy the above-described condition (1), and Comparative Examples 3, 4 and 6 in which $A/B<1$ and which did not satisfy the above-described condition (2) had unsatisfactory results in relation to the clogging of nozzle in any one or all of the water-based inks 1 to 4.

Parts or all of the embodiment and Examples described above may be also described as in the following addenda. However, the present disclosure is not limited to the following addenda.

(Addendum 1) A cleaning liquid usable for cleaning of an ink-jet recording apparatus, the cleaning liquid including:

a first water-soluble organic solvent, a vapor pressure at 20° C. of the first water-soluble organic solvent being not less than 7 Pa;

a second water-soluble organic solvent, a vapor pressure at 20° C. of the second water-soluble organic solvent being not more than 1 Pa;

a nonionic surfactant; and water.

wherein the cleaning liquid satisfies the following conditions (1) to (3):

$$10 \leq A+B \leq 60 \quad \text{Condition (1):}$$

$$A/B \geq 1 \quad \text{Condition (2):}$$

$$(A+B)/C \geq 10, \quad \text{Condition (3):}$$

in the conditions (1) to (3),

A: a content amount (% by mass) of the first water-soluble organic solvent in an entire amount of the cleaning liquid, B: a content amount (% by mass) of the second water-soluble organic solvent in the entire amount of the cleaning liquid, and C: a content amount (% by mass) of the nonionic surfactant in the entire amount of the water-based ink.

(Addendum 2) The cleaning liquid according to Addendum 1, wherein the first water-soluble organic solvent includes at least one selected from the group consisting of: propylene glycol, ethylene glycol and 1,3-butanediol.

(Addendum 3) The cleaning liquid according to Addendum 1 or 2, wherein the second water-soluble organic solvent includes at least one selected from the group consisting of: glycerol, diethylene glycol, tripropylene glycol, 1,5-pentanediol, triethylene glycol-n-butyl ether and tripropylene glycol-n-butyl ether.

(Addendum 4) The cleaning liquid according to any one of Addenda 1 to 3, wherein the nonionic surfactant includes an acetylene glycol-based surfactant having an ethylene oxide skeleton.

(Addendum 5) The cleaning liquid according to any one of Addenda 1 to 4, the cleaning liquid being usable together with a water-based ink for ink-jet recording including water-insoluble particles and water.

(Addendum 6) The cleaning liquid according to any one of Addenda 1 to 5, the cleaning liquid being usable for cleaning of at least one selected from the group consisting of: an ink-jet head, an ink channel and a wiper configured to make contact with a nozzle-formation surface of the ink-jet head and to wipe off an ink from the nozzle-formation surface, in the ink-jet recording apparatus.

(Addendum 7) A set including:

the cleaning liquid as defined in any one of Addenda 1 to 6; and a water-based ink for ink-jet recording including water-insoluble particles, and water.

(Addendum 8) An ink-jet recording apparatus including:

an ink storing part (ink storage) configured to store an ink therein;

an ink-jet head configured to discharge the ink stored in the ink storing part:

an ink channel provided between the ink storing part and the ink-jet head; and a cleaning liquid-supplying mechanism configured to supply, to the ink-jet head and the ink channel, the cleaning liquid as defined in any one of Addenda 1 to 6.

(Addendum 9) The ink-jet recording apparatus according to Addendum 8, further including a wiper configured to make contact with a nozzle-formation surface, of the ink-jet head, and to wipe off the ink from the nozzle-formation surface, wherein the cleaning liquid-supplying mechanism is configured to supply the cleaning liquid to the wiper.

(Addendum 10) The ink-jet recording apparatus according to Addendum 8 or 9, further including a drying mechanism configured to dry a recording part recorded with the ink.

(Addendum 11) A cleaning method of cleaning an ink-jet recording apparatus including: an ink storing part (ink storage), an ink-jet head, and an ink channel provided between the ink storing part and the ink-jet head, and a cleaning liquid-supplying mechanism.

the method including supplying the cleaning liquid as defined in any one of Addenda 1 to 6 to the ink-jet head and the ink channel, by using the cleaning liquid-supplying mechanism.

(Addendum 12) The cleaning method according to Addendum 11, wherein the ink-jet recording apparatus further includes a wiper configured to make contact with a nozzle-formation surface, of the ink-jet head, and to wipe off the ink from the nozzle-formation surface; and the cleaning method further includes supplying the cleaning liquid, to the wiper, by the cleaning liquid-supplying mechanism.

As described above, the cleaning liquid related to the present disclosure is capable of suppressing any closing of channel and/or clogging of nozzle during the maintenance of an ink-jet recording apparatus using a water-based ink having a satisfactory wetting property to a hydrophobic recording medium. The usage of the cleaning liquid related to the present disclosure is not particularly limited to the maintenance of the ink-jet recording apparatus using the water-based ink having the satisfactory wetting property to a hydrophobic recording medium such as the coated paper, etc., and is widely applicable to the maintenance of an ink-jet recording apparatus using a water-based ink suitable for ink-jet recording on a variety of kinds of recording medium including, for example, plain paper (regular paper), glossy paper, mat paper, etc.

What is claimed is:

1. A cleaning liquid usable for cleaning of an ink-jet recording apparatus, the cleaning liquid comprising:

a first water-soluble organic solvent, a vapor pressure at 20° C. of the first water-soluble organic solvent being not less than 7 Pa;

a second water-soluble organic solvent, a vapor pressure at 20° C. of the second water-soluble organic solvent being not more than 1 Pa;

a nonionic surfactant; and water, wherein the cleaning liquid satisfies the following conditions (1) to (3):

$$10 \leq A+B \leq 60 \quad \text{Condition (1):}$$

$$A/B \geq 1 \quad \text{Condition (2):}$$

$$(A+B)/C \geq 10, \quad \text{Condition (3):}$$

in the conditions (1) to (3),

A: a content amount (% by mass) of the first water-soluble organic solvent in an entire amount of the cleaning liquid, B: a content amount (% by mass) of the second water-soluble organic solvent in the entire amount of the cleaning liquid, and C: a content amount (% by mass) of the nonionic surfactant in the entire amount of the cleaning liquid.

2. The cleaning liquid according to claim 1, wherein the first water-soluble organic solvent includes at least one selected from the group consisting of: propylene glycol, ethylene glycol and 1,3-butanediol.

3. The cleaning liquid according to claim 1, wherein the second water-soluble organic solvent includes at least one selected from the group consisting of: glycerol, diethylene glycol, tripropylene glycol, 1,5-pentanediol, triethylene glycol-n-butyl ether and tripropylene glycol-n-butyl ether.

4. The cleaning liquid according to claim 1, wherein the nonionic surfactant includes an acetylene glycol-based surfactant having an ethylene oxide skeleton.

5. The cleaning liquid according to claim 1, the cleaning liquid being usable together with a water-based ink for ink-jet recording including water-insoluble particles and water.

6. The cleaning liquid according to claim 1, the cleaning liquid being usable for cleaning of at least one selected from the group consisting of: an ink-jet head, an ink channel and a wiper configured to make contact with a nozzle-formation surface of the ink-jet head and to wipe off an ink from the nozzle-formation surface, in the ink-jet recording apparatus.

7. A set comprising:

the cleaning liquid as defined in claim 1; and a water-based ink for ink-jet recording including water-insoluble particles and water.

8. An ink-jet recording apparatus comprising:

an ink storage configured to store an ink therein;

an ink-jet head configured to discharge the ink stored in the ink storage;

an ink channel provided between the ink storage and the ink-jet head; and a cleaning liquid-supplying mechanism configured to supply, to the ink-jet head and the ink channel, the cleaning liquid as defined in claim 1.

9. The ink-jet recording apparatus according to claim 8, further comprising a wiper configured to make contact with a nozzle-formation surface of the ink-jet head and to wipe off the ink from the nozzle-formation surface, wherein the cleaning liquid-supplying mechanism is configured to supply the cleaning liquid to the wiper.

10. The ink-jet recording apparatus according to claim 8, further comprising a drying mechanism configured to dry a recording part recorded with the ink.

11. A cleaning method of cleaning an ink-jet recording apparatus including: an ink storage, an ink-jet head, an ink channel provided between the ink storage and the ink-jet head, and a cleaning liquid-supplying mechanism, the cleaning method comprising supplying the cleaning liquid as defined in claim 1 to the ink-jet head and the ink channel, by using the cleaning liquid-supplying mechanism.

12. The cleaning method according to claim 11, wherein the ink-jet recording apparatus further includes a wiper configured to make contact with a nozzle-formation surface of the ink-jet head and to wipe off an ink from the nozzle-formation surface; and the cleaning method further comprises supplying the cleaning liquid to the wiper by the cleaning liquid-supplying mechanism.

* * * * *